United States Patent
Goto et al.

(10) Patent No.: US 9,140,500 B2
(45) Date of Patent: Sep. 22, 2015

(54) HEAT STORAGE APPARATUS FOR VEHICLE

(75) Inventors: Miyuki Goto, Kasugai (JP); Satoru Shiga, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 537 days.

(21) Appl. No.: 13/394,489

(22) PCT Filed: Mar. 22, 2011

(86) PCT No.: PCT/JP2011/056791
§ 371 (c)(1),
(2), (4) Date: Mar. 6, 2012

(87) PCT Pub. No.: WO2012/127610
PCT Pub. Date: Sep. 27, 2012

(65) Prior Publication Data
US 2012/0241121 A1    Sep. 27, 2012

(51) Int. Cl.
*F28D 20/02* (2006.01)
*F02G 5/00* (2006.01)
(Continued)

(52) U.S. Cl.
CPC ............... *F28D 20/028* (2013.01); *F02G 5/00* (2013.01); *F02G 5/02* (2013.01); *F28D 20/02* (2013.01); *F01P 11/20* (2013.01); *Y02E 60/145* (2013.01); *Y02T 10/166* (2013.01)

(58) Field of Classification Search
CPC ..................................................... F28D 20/028
USPC ............... 165/10, 41, 202, 210, 247
See application file for complete search history.

(56) References Cited

U.S. PATENT DOCUMENTS 2,713,252 A * 7/1955 Jackson et al. ................ 165/236
4,063,546 A * 12/1977 Schmid et al. ................ 126/610
4,127,161 A * 11/1978 Clyne et al. ................... 165/294
(Continued)

FOREIGN PATENT DOCUMENTS

JP    57-002414 A    1/1982
JP    57-006296 A    1/1982
(Continued)

*Primary Examiner* — Marc Norman
*Assistant Examiner* — Devon Russell
(74) *Attorney, Agent, or Firm* — Kenyon & Kenyon LLP

(57) ABSTRACT

When performing heat storage in a heat storage container accommodating a plurality of kinds of heat storage materials with different melting points, heat storage in the heat storage materials is performed such that a higher melting point heat storage material is in a latent heat storage state as much as possible. In other words, heat storage in the heat storage materials is performed in such a manner that the heat storage materials are in the latent heat storage state in which heat can be stored most effectively. In addition, when performing heat release from the heat storage container to heat coolant water in a circulation circuit, heat release is performed from the heat storage material in the sensible heat storage state as a priority, out of the heat storage materials. Accordingly, heat release from the heat storage container in the heat storage state is performed in such a manner that the heat storage materials are maintained in latent heat storage state for as a long period of time as possible. When heat release from the heat storage container is performed in this manner, the heat storage materials can be kept in the latent heat storage state for as a long period of time as possible. As in the foregoing, the heat storage container can be kept in the heat storage state for a long period of time.

5 Claims, 5 Drawing Sheets

(51) Int. Cl.
*F02G 5/02* (2006.01)
*F01P 11/20* (2006.01)

(56) References Cited

U.S. PATENT DOCUMENTS

| | | | |
|---|---|---|---|
| 4,265,223 A * | 5/1981 | Miserlis et al. | 126/592 |
| 4,402,188 A * | 9/1983 | Skala | 62/56 |
| 4,415,118 A * | 11/1983 | Endo | 237/12.3 A |
| 6,059,016 A * | 5/2000 | Rafalovich et al. | 165/41 |
| 7,669,647 B2 * | 3/2010 | Tsubone et al. | 165/202 |
| 8,272,432 B2 * | 9/2012 | Major et al. | 165/202 |
| 8,584,734 B2 * | 11/2013 | Shimozono | 165/10 |
| 8,631,855 B2 * | 1/2014 | Maxik et al. | 165/10 |
| 2001/0018971 A1 * | 9/2001 | Tabuchi et al. | 165/236 |
| 2008/0066736 A1 * | 3/2008 | Zhu | 126/620 |
| 2010/0251711 A1 * | 10/2010 | Howes et al. | 60/659 |
| 2012/0227926 A1 * | 9/2012 | Field et al. | 165/10 |
| 2012/0247707 A1 * | 10/2012 | Surdeanu et al. | 165/10 |

FOREIGN PATENT DOCUMENTS

| | | |
|---|---|---|
| JP | 61-247856 A | 11/1986 |
| JP | 02-090347 U | 7/1990 |
| JP | 05-196379 A | 8/1993 |
| JP | 05-203202 A | 8/1993 |
| JP | 06-185411 A | 7/1994 |
| JP | 2008-144983 A | 6/2008 |
| JP | 2008-240734 A | 10/2008 |
| JP | 2009-257254 A | 11/2009 |
| JP | 2010-196974 A | 9/2010 |

* cited by examiner

HEAT STORAGE APPARATUS FOR VEHICLE

This is a 371 national phase application of PCT/JP2011/056791 filed 22 Mar. 2011, the contents of which are incorporated herein by reference.

FIELD OF THE INVENTION

The present invention relates to a heat storage apparatus for a vehicle.

BACKGROUND OF THE INVENTION

Vehicles such as automobiles are provided with a heat storage apparatus that temporarily stores surplus heat from heat sources of the vehicles in a heat storage body, and releases and uses the heat stored in the heat storage body for heating temperature adjustment sections of the vehicles and the like. In such a heat storage apparatus, employing a heat storage body capable of latent heat storage as the foregoing heat storage body is effective in increasing the amount of heat storage in the heat storage body while keeping the capacity of the heat storage body low. Latent heat storage refers to heat storage utilizing absorption and release of heat in/from a material forming the heat storage body with state changes of the material (for example, changes between solid and liquid states).

FIG. 6 shows a relationship between changes in state of a heat storage body capable of latent heat storage and changes in temperature of the heat storage body.

As understood from the drawing, if heat from a heat source of a vehicle is provided to a heat storage body in a solid state, the temperature of the heat storage body increases and reaches a melting point T. After that, if heat is continuously provided to the heat storage body, the heat storage body gradually changes from a solid state to a liquid state at an almost constant temperature. Then, if the heat storage body entirely changes to a liquid state, the temperature of the heat storage body begins to increase again due to the provision of heat.

On the other hand, if the heat stored in the heat storage body in a liquid state is used for heating a temperature adjustment section of the vehicle, the heat stored in the heat storage body is released. When the heat is thus released from the heat storage body, the temperature of the heat storage body decreases from a value higher than the melting point T to the melting point T. After that, if the heat is continuously released from the heat storage body, the heat storage body gradually changes from a liquid state to a solid state at an almost constant temperature. Then, when the heat storage body entirely changes to a solid state, the temperature of the heat storage body begins to decrease again due to the release of heat.

When heat is stored in the heat storage body in a solid state, the heat storage body is in a sensible heat storage state and therefore the heat storage apparatus performs sensible heat storage. In addition, when the heat storage body enters a liquid state, in other words, the heat storage body enters a latent heat storage state, due to application of heat to the heat storage body, the heat storage apparatus performs latent heat storage. To retain the heat storage state of the heat storage apparatus for a long period of time, it is preferred to keep the heat storage body in the latent heat storage state. Accordingly, in the heat storage apparatus equipped with a heat storage body capable of latent heat storage, it is desired that the heat storage body is kept in the latent heat storage state as much as possible.

To realize this, Patent Document 1 discloses that a heat storage body is separated into a plurality of parts, and heat from a heat source of a vehicle is applied to the separated heat storage parts in order at the time of heat storage. Specifically, heat from the heat source of the vehicle is selectively applied to the separated heat storage parts so as to enter them one by one into the latent heat storage state. In this case, when heat from the heat source of the vehicle is applied to the heat storage parts for heat storage in the heat storage parts, it is possible to enter promptly at least a part of the heat storage body into the latent heat storage state. If at least a part of the heat storage body can be entered into the latent heat storage state in such a manner as described above, it is possible to keep the heat storage apparatus in the heat storage state for a longer period of time.

PRIOR ART DOCUMENT

Patent Document

Patent Document 1

Japanese Laid-Open Patent Publication No. 6-185411 (paragraph [0046], FIG. 2)

SUMMARY OF THE INVENTION

According to Patent Document 1, at least a part of the heat storage body can enter promptly the latent heat storage state at the time of heat storage in the heat storage body of the heat storage apparatus. However, to keep the heat storage apparatus in the heat storage state for a longer period of time, it is further preferred to put as many parts as possible of the heat storage body into the latent heat storage state for a time between the instant when heat storage in the heat storage body is started and the instant when heat generation at the heat source of the vehicle is stopped. Accordingly, to realize this, the technique disclosed in Patent Document 1 has room for further improvement.

In addition, the manner of heat release from the heat storage body in the heat storage state for heating the temperature adjustment section of the vehicle also has influence on a period of time during which the heat storage apparatus is kept in the heat storage state. Specifically, the greater number of parts of the heat storage body that enter the latent heat storage state after heat release from the heat storage body, the longer the period of time during which heat storage apparatus can be kept in the heat storage state. However, Patent Document 1 does not describe in detail the manner of heat release from the heat storage body. Accordingly, the technique disclosed in Patent Document 1 also has room for further improvement in the manner of heat release from the heat storage body intended to keep the heat storage apparatus in the heat storage state for a longer period of time.

The present invention is devised in light of such circumstances, and an objective of the present invention is to provide a heat storage apparatus for a vehicle that is capable of keeping a heat storage body in a heat storage state for a further longer period of time.

To achieve the foregoing objective, a heat storage apparatus for a vehicle according to the present invention includes a heat storage body capable of storing latent heat upon receiving heat from a heat source of a vehicle, and a control section controlling heat storage in the heat storage body and heat release from the heat storage body. The heat storage body includes a plurality of kinds of heat storage materials with different melting points. In accordance with the heat storage amount left in the heat storage body, the control section changes the manner of heat storage in the plurality of kinds of heat storage materials or the manner of heat release from the plurality of kinds of heat storage materials. Accordingly, when heat from the heat source of the vehicle is applied to the plurality of kinds of heat storage materials for heat storage in the heat storage body, it is possible to perform the heat storage in a manner of heat storage so as to enter the heat storage materials most efficiently into a latent heat storage state in accordance with an amount of heat left in the heat storage body. In addition, at the time of heat release from the plurality of kinds of heat storage materials in the heat storage state, it is also possible to perform the heat release in a manner of heat release so as to maintain the heat storage materials in the latent heat storage state for as a long period of time as possible in accordance with an amount of heat left in the heat storage body. As in the foregoing, the plurality of kinds of heat storage materials can be kept in the latent heat storage state for a longer period of time by performing heat storage and heat release in/from the plurality of kinds of heat storage materials.

In one aspect of the present invention, as a plurality of kinds of heat storage materials, two kinds of heat storage materials are provided: a heat storage material with a low melting point and a heat storage material with a higher melting point. In this arrangement, heat storage can be performed more effectively in the case of having the heat storage material with a higher melting point in the latent heat storage state than in the case of having the low melting point heat storage material in the latent heat storage state. Accordingly, at the time of heat storage in the heat storage body, based on an estimated amount of incoming heat from the heat source of the vehicle to the heat storage body and an amount of heat left in the heat storage material with a higher melting point, the control section determines whether latent heat storage is possible in the heat storage material with a higher melting point by the estimated incoming heat amount. If it is determined that latent heat storage is possible in the higher melting point heat storage material, the control section performs the same as a priority. In addition, if it cannot be determined whether latent heat storage is possible in the heat storage material with a higher melting point or it is determined that latent heat storage is impossible in the heat storage material with a higher melting point, the control section performs heat storage in the heat storage material with a lower melting point as a priority. Accordingly, heat storage is performed in the heat storage body such that the heat storage material with a higher melting point is in the latent heat storage state as much as possible. In other words, heat storage can be performed in the heat storage materials in such a manner that the heat storage body is in the latent heat storage state where heat can be stored most effectively (the latent heat storage state where heat can be stored for the longest period of time).

In accordance with one aspect of the present invention, when performing heat release from the heat storage body, the control section performs heat release from a heat storage material in a sensible heat storage state as a priority, out of the plurality of kinds of heat storage materials. Accordingly, heat release from the plurality of kinds of heat storage materials in the heat storage state is performed in such a manner that the heat storage materials can be maintained in the latent heat storage state for as a long period of time as possible. In this manner, heat release from the plurality of kinds of heat storage materials makes it possible to keep the heat storage materials in the latent heat storage state for a long period of time.

In accordance with one aspect of the present invention, based on a required outgoing heat amount for heating a temperature adjustment section of the vehicle and the heat storage amounts of the plurality of kinds of heat storage materials, the control sections determines whether it is possible to satisfy the required outgoing heat amount only by the heat storage amount in the heat storage material in the sensible heat storage state out of the plurality of kinds of heat storage materials. Then, if it is determined that the required outgoing heat amount can be satisfied only by the heat storage amount in the heat storage materials in the sensible heat storage state, the control section performs heat release only from the heat storage material in the sensible heat storage state to apply required heat to the temperature adjustment section of the vehicle. In contrast, if it is determined that the required outgoing heat amount cannot be satisfied only by the heat storage amount in the heat storage materials in the sensible heat storage state, the control section performs heat release also from the heat storage material in the latent heat storage state to apply required heat to the temperature adjustment section of the vehicle. Accordingly, if required application of heat to the temperature adjustment section of the vehicle cannot be performed only by the heat storage amount in the heat storage material in the sensible heat storage state, it is possible to perform heat release also from the heat storage material in the latent heat storage state to realize promptly the required application of heat, while keeping the heat storage material in the latent heat storage state for as a long period of time as possible.

In accordance with one aspect of the present invention, if it is determined that the required outgoing heat amount cannot be satisfied only by the heat storage amount in the heat storage material in the sensible heat storage state out of the plurality of kinds of heat storage materials, the control section performs heat release only from the heat storage material in the sensible heat storage state until after a lapse of a predetermined period of time since the determination, to apply heat to the temperature adjustment section of the vehicle. Then, if it is determined even after the lapse of the predetermined period of time that the required outgoing heat amount cannot be satisfied only by the heat storage amount in the heat storage material in the sensible heat storage state, the control section performs heat release also from the heat storage material in the latent heat storage state to apply heat to the temperature adjustment section of the vehicle.

In this arrangement, the required outgoing heat amount for heating the temperature adjustment section of the vehicle varies with changes in the amount of heat applied directly from the heat source of the vehicle to the temperature adjustment section. Accordingly, immediately after it is determined that the required outgoing heat amount for heating the temperature adjustment section of the vehicle cannot be satisfied only by the heat storage amount in the heat storage material in the sensible heat storage state, out of the plurality of kinds of heat storage materials, the amount of heat applied directly from the heat source of the vehicle to the temperature adjustment section may increase to reduce the required outgoing heat amount. If heat release from the heat storage material in the latent heat storage state is performed under such circumstances, even though the required outgoing heat amount can be satisfied only by heat release from the heat storage material in the sensible heat storage state, the heat storage material in the latent heat storage state may release heat and unnecessarily shift to the sensible heat storage state.

As described above, however, even after it is determined that the required outgoing heat amount cannot be satisfied only by the heat storage amount in the heat storage material in the sensible heat storage state, the control section still performs heat release from the heat storage material in the sensible heat storage state until after the lapse of the predetermined period of time. In addition, if it is determined that the required outgoing heat amount cannot be satisfied even after the lapse of the predetermined period of time, the control section performs heat release from the heat storage material in the latent heat storage state. Accordingly, under such circumstances where the required outgoing heat amount is decreased immediately after it is determined that the required outgoing heat amount cannot be satisfied, it is possible prevent the heat storage material in the latent heat storage state from releasing heat and unnecessarily shifting to the sensible heat storage state.

DETAILED DESCRIPTION OF THE PREFERRED EMBODIMENTS

First Embodiment

A heat storage apparatus for an automobile according to a first embodiment of the present invention will be described below with reference to FIGS. 1 to 4.

Figure 1:
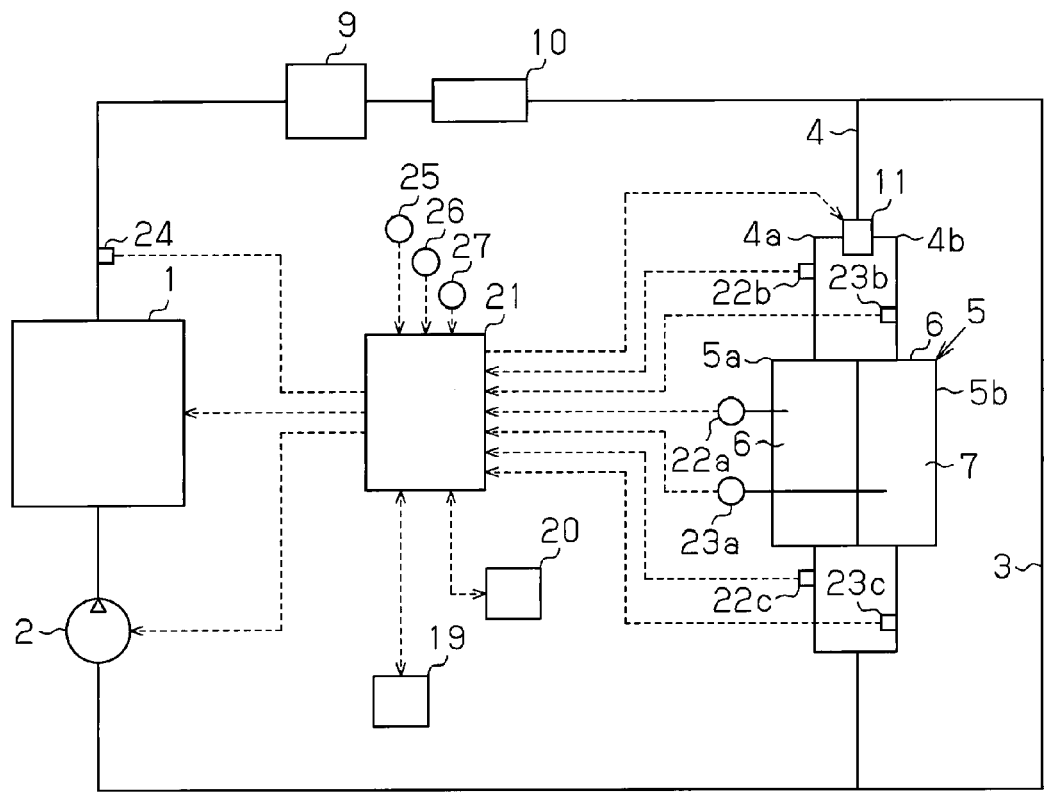
FIG. 1 is a schematic diagram showing the entire configuration of a heat storage apparatus in a first embodiment.
Figure 2:
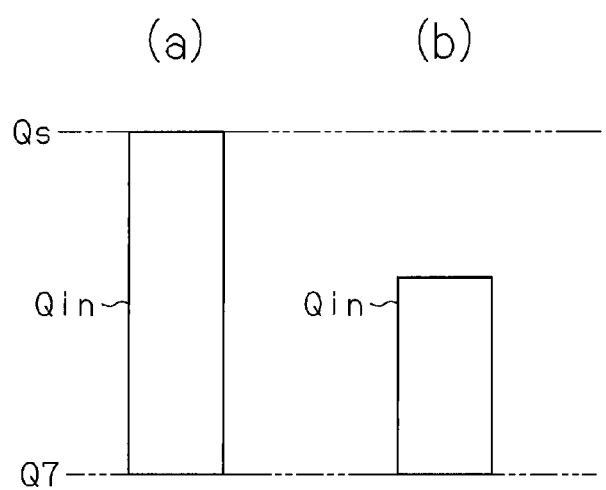
FIGS. 2(a) and 2(b) are illustrative diagrams showing relationships among a current heat storage amount in a heat storage material, an estimated incoming heat amount, and a heat storage amount in the heat storage material in a latent heat storage state.

The automobile is provided with a circulation circuit for circulating coolant water (heat medium) for heat exchange with an engine 1, as shown in FIG. 1. The coolant water in the circulation circuit is circulated using an electrically-operated water pump 2, for example. In the circulation circuit, the coolant water discharged from the water pump 2 passes through the engine 1, a heater core 9, an exhaust heat recovery unit 10, and a main passage 3, and then returns to the water pump 2. The heater core 9 is intended to heat the interior of the automobile through an air-conditioner mounted in the automobile by warming air supplied from the air-conditioner by heat from coolant water. The exhaust heat recovery unit 10 is intended to recover the heat from exhaust air from the engine 1 by coolant water passing through the exhaust heat recovery unit 10, due to heat exchange between the coolant water and the exhaust air.

In the automobile, the engine 1, the exhaust heat recovery unit 10, and the like serve as heat sources to transfer heat therefrom to the coolant water circulating in the circulation circuit. The heat storage apparatus in the automobile stores temporarily surplus heat from the heat sources such as the engine 1 and the exhaust heat recovery unit 10, and releases the stored heat for use in heating a part to be heated in the automobile (hereinafter, referred to as temperature adjustment section) and the like. The structure of the heat storage apparatus in the automobile will be described in detail.

In the circulation circuit, a bypass passage 4 bypassing a main passage 3 is provided downstream of the exhaust heat recovery unit 10 and upstream of the water pump 2. The bypass passage 4 has a heat storage container 5 heat-insulated from the outside. The heat storage container 5 holds a heat storage body capable of performing latent heat storage and causing supercooling phenomenon. An interior of the heat storage container 5 is partitioned into two accommodating chambers 5a and 5b. The accommodating chambers 5a and 5b accommodate heat storage materials 6 and 7, respectively. Specifically, the accommodating chamber 5a accommodates the low melting point heat storage material 6, and the accommodating chamber 5b accommodates the heat storage material 7 with a higher melting point than that of the heat storage material 6. That is, the heat storage body accommodated in the heat storage container 5 includes a plurality of kinds of heat storage materials 6 and 7 with different melting points. In addition, the bypass passage 4 is branched into flow-split parts 4a and 4b passing through the accommodating chambers 5a and 5b, respectively, upstream of the heat storage container 5. The flow-split parts 4a and 4b join together downstream of the heat storage container 5.

The heat storage container 5 in the bypass passage 4 is configured to allow coolant water at a high temperature to flow into the accommodating chambers 5a and 5b to apply the heat from the coolant water to the heat storage materials 6 and 7, to thereby store surplus heat from the heat sources of the automobile in the heat storage materials 6 and 7. In addition, the heat storage container 5 allows coolant water at low temperature to flow into the accommodating chambers 5a and 5b to draw heat from the heat storage materials 6 and 7, and then allows the water having increased temperature due to heat flow out of the accommodating chambers 5a and 5b, thereby realizing release of the heat stored in the heat storage materials 6 and 7. The bypass passage 4 has at a branch portion between the flow-split parts 4a and 4b, a switch valve 11 to be switched among first to fourth switch positions for disabling and enabling distribution of the coolant water through the flow-split parts 4a and 4b. The switch valve 11 at the first to fourth switch positions functions as described below.

The switch valve 11, when being switched to the first switch position, disables distribution of the coolant water through the flow-split part 4a and disables distribution of the coolant water through the flow-split part 4b. The switch valve 11, when being switched to the second switch position, enables distribution of the coolant water through the flow-split part 4a and disables distribution of the coolant water through the flow-split part 4b. The switch valve 11, when being switched to the third switch position, disables distribution of the coolant water through the flow-split part 4a and enables distribution of the coolant water through the flow-split part 4b. The switch valve 11, when being switched to the fourth switch position, enables distribution of the coolant water through the flow-split part 4a and enables distribution of the coolant water through the flow-split part 4b.

Next, the electrical configuration of the heat storage apparatus in this embodiment will be described.

The heat storage apparatus includes an electronic control unit 21 for executing control of various devices mounted in the automobile. The electronic control unit 21 is configured to have a CPU for executing various computing processes in relation to the foregoing control, a ROM for storing programs and data required for the control, a RAM for temporarily storing results of the computing processes by the CPU, input/output ports for inputting/outputting signals between the electronic control unit 21 and the outside, and the like. In addition, the electronic control unit 21 is connected via a control area network (CAN) to an air-conditioning control computer 20 responsible for control of heating air by the heater core 9 and supplying the heated air into the vehicle interior and to a navigation system 19 installed in the automobile. The electronic control unit 21 shares required information with the air-conditioning control computer 20 and the navigation system 19 via intercommunications.

The input ports in the electronic control unit 21 are connected to various sensors and the like as shown below:

- a first temperature sensor 22a that detects a temperature of the low melting point heat storage material 6 accommodated in the accommodating chamber 5a of the heat storage container 5;
- a first inlet water temperature sensor 22b that detects temperature of coolant water flowing into the accommodating chamber 5a through the flow-split part 4a of the bypass passage 4;
- a first outlet water temperature sensor 22c that detects a temperature of coolant water flowing out of the accommodating chamber 5a through the flow-split part 4a of the bypass passage 4;
- a second temperature sensor 23a that detects a temperature of the high melting point heat storage material 7 accommodated in the accommodating chamber 5b of the heat storage container 5;
- a second inlet water temperature sensor 23b that detects a temperature of coolant water flowing into the accommodating chamber 5b through the flow-split part 4b of the bypass passage 4;
- a second outlet water temperature sensor 23c that detects a temperature of coolant water flowing out of the accommodating chamber 5b through the flow-split part 4a of the bypass passage 4;
- an engine water temperature sensor 24 that detects a temperature of coolant water at an outlet of the engine 1 in the circulation circuit;
- an air flow meter 25 that detects the amount of intake air in the engine 1;
- a rotational speed sensor 26 that detects the rotational speed of an output shaft of the engine 1 (engine rotational speed); and
- an exhaust temperature sensor 27 that detects an exhaust temperature upstream of a medium in the exhaust system of the engine 1.

The electronic control unit 21 has output ports connected to drive circuits of various devices for driving the engine 1, a drive circuit of the water pump 2, a drive circuit of the switch valve 11, and the like.

In addition, the electronic control unit 21 obtains engine operation condition including an engine rotational speed and an engine load (the amount of air taken into a combustion chamber 2 in each cycle of the engine 1), in accordance with detection signals from the foregoing sensors. The electronic control unit 21 outputs command signals to the drive circuits of the devices for driving the engine 1 connected to the output ports, in accordance with the engine operation condition including an engine load and an engine rotational speed. Accordingly, various operation controls are performed on the engine 1, such as fuel injection control, ignition timing control, and throttle opening control, for example, through the electronic control unit 21.

In addition, the electronic control unit 21 obtains the temperature of coolant water in the circulation circuit, the amount of heat required in the engine 1 and the heater core 9, the amount of heat stored in the heat storage container 5 (the heat storage materials 6 and 7), and the amount of heat applied to the coolant water from the exhaust heat recovery unit 10, and the like, in accordance with detection signals from the foregoing sensors and the like. The electronic control unit 21 outputs command signals to the drive circuit of the water pump 2 and the drive circuit of the switch valve 11, which are connected to the output ports, in accordance with the obtained temperature and heat amounts. Accordingly, drive control of the water pump 2, switch control of the switch valve 11, and the like, in the heat storage apparatus of the automobile, are performed through the electronic control unit 21. As in the foregoing, the electronic control unit 21 performing drive control of the water pump 2 and switch control of the switch valve 11 functions as a control section that controls heat storage in the heat storage container 5 (the heat storage materials 6 and 7) and heat release from the heat storage container 5.

Next, an overview of heat storage in the heat storage container 5 and heat release from the heat storage container 5 in the heat storage apparatus will be provided.

In the heat storage apparatus, if the heat of the coolant water circulating in the circulation circuit can be applied to the heat storage materials 6 and 7 in the heat storage container 5, heat storage is performed in the heat storage materials 6 and 7. Specifically, when the switch valve 11 is switched to the second switch position or the third switch position, distribution of the coolant water through the flow-split part 4a or the flow-split part 4b of the bypass passage 4 is enabled, and the coolant water at a high temperature is flown into the accommodating chamber 5a or the accommodating chamber 5b of the heat storage container 5 through the flow-split part 4a or the flow-split part 4b of the bypass passage 4. Then, when the coolant water at high temperature passes through the accommodating chamber 5a and 5b of the heat storage container 5, heat from the coolant water is transferred to the heat storage materials 6 and 7 by heat exchange between the coolant water and the heat storage materials 6 and 7 in the accommodating chambers 5a and 5b. When the heat transfer increases the heat storage materials 6 and 7 in temperature in a solid state, the heat storage container 5 performs sensible heat storage. After that, when the heat storage materials 6 and 7 further increase in temperature and change from a solid state to a liquid state, the heat storage container 5 performs latent heat storage. After heat storage in the heat storage container 5, when the switch valve 11 is switched to the first switch position, the heat storage container 5 (the heat storage materials 6 and 7) is kept in the heat storage state (sensible heat storage state or latent heat storage state).

In this arrangement, with regard to heat storage in the heat storage container 5, when comparison is made between the case where only the high melting point heat storage material 7 is in the latent heat storage state and the case where only the low melting point heat storage material 6 is in the latent heat storage state, it is understood that heat can be stored more effectively in the case where only the high melting point heat storage material 7 is in the latent heat storage state than in the case where only the low melting point heat storage material 6 is in the latent heat storage state. Considering this respect, at the time of heat storage in the heat storage materials 6 and 7, the manner of heat storage in the heat storage materials 6 and 7 is changed in accordance with an estimated incoming heat amount Qin from the heat sources of the automobile (directly from the coolant water in the circulation circuit) to the heat storage materials 6 and 7, and a heat storage amount Q7 left in the heat storage material 7. The estimated incoming heat amount Qin refers to an estimated value of heat amount applicable to the heat storage materials 6 and 7 until after the end of operation of the automobile.

In addition, if the high melting point heat storage material 7 can be increased in temperature to change to a liquid and enter the latent heat storage state by heat of the estimated incoming heat amount Qin, the heat storage apparatus enters a first heat storage mode in which heat storage in the heat storage material 7 is performed as a priority. Specifically, as shown in FIG. 2(a), if a value obtained by adding the estimated incoming heat amount Qin to the heat storage amount Q7 in the heat storage material 7 is equal to or more than a heat storage amount Qs by which the heat storage material 7 can enter the latent heat storage state, heat storage in the heat storage materials 6 and 7 is performed in the first heat storage mode. On the other hand, if it cannot be determined whether the high melting point heat storage material 7 can enter the latent heat storage state by the heat of the estimated incoming heat amount Qin or if it is determined that the heat storage material 7 cannot be entered into the latent heat storage state by the heat of the estimated incoming heat amount Qin, the heat storage apparatus enters a second heat storage mode in which heat storage in the low melting point heat storage material 6 is performed as a priority. Specifically, as shown in FIG. 2(b), if a value obtained by adding the estimated incoming heat amount Qin to the heat storage amount Q7 in the heat storage material 7 is less than the heat storage amount Qs by which the heat storage material 7 can enter the latent heat storage state, heat storage in the heat storage materials 6 and 7 is performed in the second heat storage mode.

As in the foregoing, heat storage in the heat storage container 5 (the heat storage materials 6 and 7) is performed such that the high melting point heat storage material 7 is in the latent heat storage state as much as possible. In other words, heat storage in the heat storage materials 6 and 7 is performed in such a manner that the heat storage materials 6 and 7 are in the latent heat storage state in which heat can be stored most effectively (the latent heat storage state in which heat can be stored for the longest period of time).

In the heat storage apparatus, if the heat stored in the heat storage container 5 should be used to heat the temperature adjustment section of the automobile, for example, if the temperature of the coolant water circulating in the circulation circuit is less than a determination value for determining completion of warming-up of the engine 1 and thus the coolant water should be heated, heat is released from the heat storage container 5 (the heat storage materials 6 and 7). At that time, the coolant water in the circulation circuit constitutes the temperature adjustment section to be heated using the heat stored in the heat storage container 5 in the automobile. When heat is released from the heat storage container 5 (the heat storage materials 6 and 7), the switch valve 11 is switched to any of the first to fourth switch positions. Accordingly, distribution of the coolant water through at least one of the flow-split part 4a and 4b of the bypass passage 4 is enabled. Because of this, the coolant water at a low temperature passes through at least one of the accommodating chamber 5a and 5b. When the coolant water at a low temperature passes through the accommodating chamber 5a or 5b, heat from the heat storage materials 6 and 7 is transferred to the coolant water through heat exchange between the coolant water at a low temperature and the heat storage materials 6 and 7. When the coolant water heated to a high temperature by the transfer of heat from the heat storage materials 6 and 7 flows out of the heat storage container 5 in this manner, the heat stored in the heat storage container 5 (the heat storage materials 6 and 7) is released. As a result, the coolant water circulating in the circulation circuit is heated using the heat stored in the heat storage container 5. In addition, the heat storage materials 6 and 7 of the heat storage container 5 decrease in temperature with the transfer of their heat to the coolant water. Then, when the heat storage materials 6 and 7 decrease in temperature as described above in the latent heat storage state (in a liquid state), the heat storage materials 6 and 7 gradually change to a solid. When the heat storage materials 6 and 7 change from a liquid to a solid, the heat storage materials 6 and 7 shift from the latent heat storage state to the sensible heat storage state.

In the heat storage container 5, to hold the heat stored in the heat storage materials 6 and 7 for a long period of time, it is preferred to keep the high melting point heat storage material 7 in the latent heat storage state for as a long period of time as possible. Considering this matter, at the time of heat release from the heat storage materials 6 and 7, the manner of heat release from the heat storage materials 6 and 7 is changed, based on a required outgoing heat amount Qout for heating the coolant water in the circulation circuit (temperature adjustment section of the automobile) such that the temperature of the coolant water increases up to a determination value for determining completion of warming-up of the engine 1 and heat storage amounts Q6 and Q7 left in the heat storage materials 6 and 7. The required outgoing heat amount Qout refers to a heat amount that needs to be released from the heat storage container 5 to increase the temperature of the coolant water in the circulation circuit up to the foregoing determination value.

In addition, if the required outgoing heat amount Qout can be satisfied only by a heat storage amount left in the heat storage material in the sensible heat storage state out of the heat storage materials 6 and 7, the heat storage apparatus enters a first heat release mode in which heat release is performed only from the heat storage material in the sensible heat storage state. Specifically, required heat is applied to the coolant water in the circulation circuit (temperature adjustment section of the automobile) by performing heat release from the heat storage materials 6 and 7 in the first heat release mode. On the other hand, if it cannot be determined whether the required outgoing heat amount Qout can be satisfied only by the heat storage amount left in the heat storage material in the sensible heat storage state out of the heat storage materials 6 and 7 or if the required outgoing heat amount Qout cannot be satisfied only by the foregoing heat storage amount, the heat storage apparatus enters a second heat release mode in which heat release is performed also from the heat storage material in latent heat storage state. Specifically, when heat release from the heat storage materials 6 and 7 is performed in the second heat release mode, heat release is performed not only from the heat storage material in the sensible heat storage state but also from the heat storage material in the latent heat storage state, and through the heat release, required heat is applied to the coolant water in the circulation circuit (temperature adjustment section of the automobile).

As in the foregoing, when the temperature adjustment section of the automobile should be heated using the heat stored in the heat storage container 5 (the heat storage materials 6 and 7), at the time of heat release from the heat storage materials 6 and 7 to realize the heat application, heat release is performed as a priority from one of the heat storage materials 6 and 7 that is in the sensible heat storage state. Accordingly, heat release from the heat storage container 5 (the heat storage materials 6 and 7) is performed in a manner that the heat storage materials 6 and 7 are kept in the latent heat storage state for as a long period of time as possible.

Figure 3:
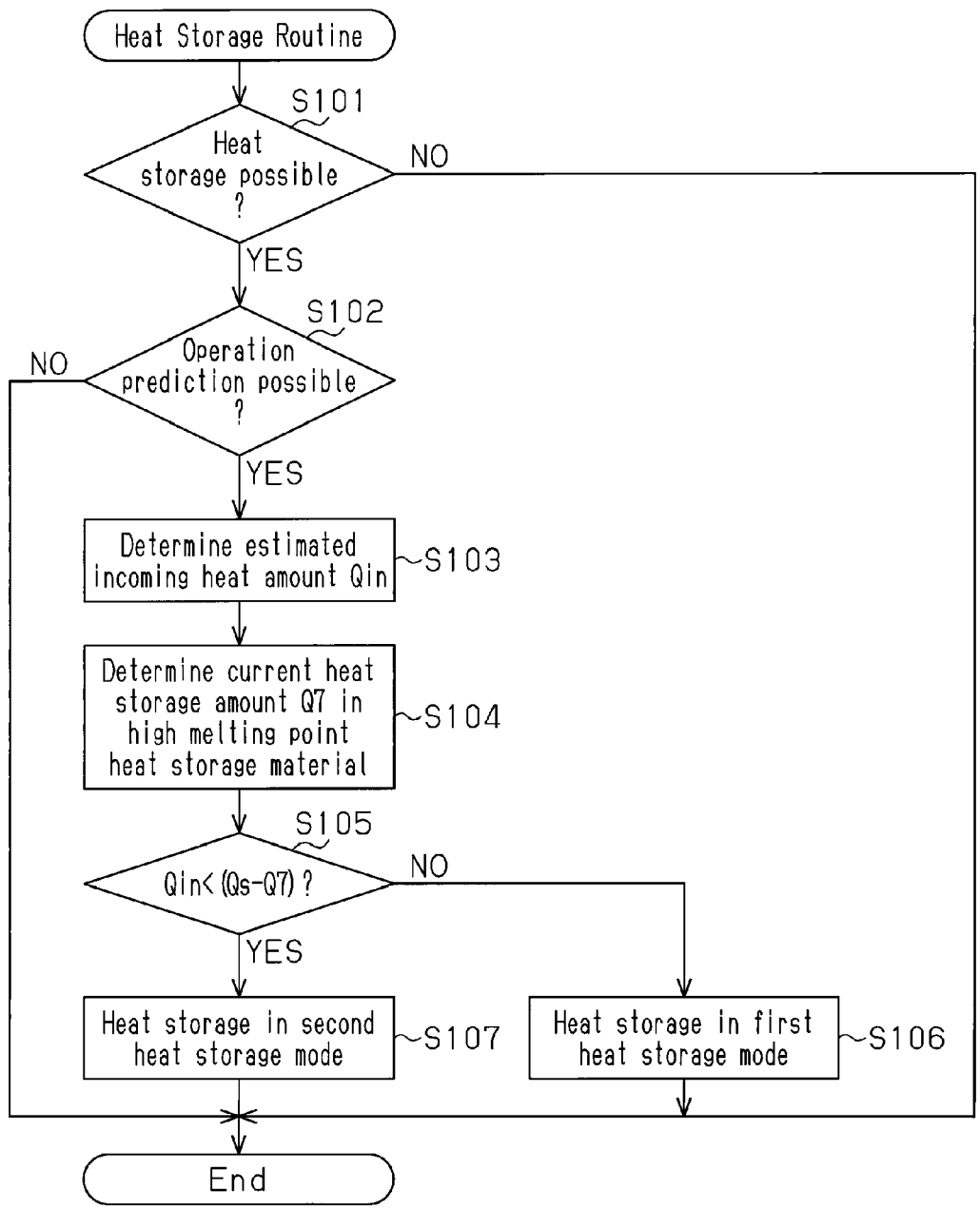
FIG. 3 is a flowchart of a procedure for heat storage in the heat storage apparatus.

Next, heat storage in the heat storage container 5 (the heat storage materials 6 and 7) will be described in detail with reference to a flowchart for a heat storage routine shown in FIG. 3. The heat storage routine is executed by the electronic control unit 21 periodically by time interruptions at predetermined time intervals, for example.

In the routine, it is first determined whether heat storage is possible in the heat storage materials 6 and 7 (S101). Specifically, it is determined whether the heat of the coolant water circulating in the circulation circuit can be applied to the heat storage materials 6 and 7, more specifically, whether the temperature of the coolant water is higher than the temperatures of the heat storage materials 6 and 7. Then, if it is determined that the temperature of the coolant water circulating in the circulation circuit is higher than those of the heat storage materials 6 and 7 and thus heat storage is possible in the heat storage materials 6 and 7, steps for performing heat storage in the heat storage materials 6 and 7 (S102 to S107) are performed.

In the series of steps, at S102, it is determined whether an operation of the automobile until stoppage can be predicted. Specifically, it is determined whether the destination of the automobile this time is set at the navigation system 19 operated by an occupant of the automobile, in accordance with various kinds of information from the system 19. Then, if the destination is set at the navigation system 19, it is determined that an operation of the automobile until stoppage can be predicted. After that, the estimated incoming heat amount Qin is determined at S103.

The estimated incoming heat amount Qin is determined by a heat amount applied from the heat sources of the automobiles such as the engine 1 and the exhaust heat recovery unit 10 to the coolant water in the circulation circuit until stoppage of the automobile. This heat amount can be estimated by predicting a running distance and a travel time until stoppage of the automobile based on the destination and the current position of the automobile this time as information acquired from the navigation system 19, and further by referring to an operating history (operating manner) of the automobile recorded in the RAM of the electronic control unit 21. Then, based on the heat amount and the like to be applied to the coolant water estimated from the running distance, travel time, operating history, and the like, the estimated incoming heat amount Qin indicative of a heat amount applicable to the heat storage materials 6 and 7 until end of operation of the automobile, can be determined.

At S104, the current heat storage amount Q7 in the heat storage material 7 is determined using the current temperature of the heat storage material 7 detected by the second temperature sensor 23a and a cumulative value of heat amounts having so far come into and gone out of the heat storage material 7 and the like. The cumulative value of heat amounts having so far come into and gone out of the heat storage material 7 can be calculated using signals from the second inlet water temperature sensor 23b and the second outlet water temperature sensor 23c. Then, at S105, the estimated incoming heat amount Qin is compared with a value obtained by subtracting the heat storage amount Q7 left in the current heat storage material 7 from the heat storage amount Qs capable of entering the high melting point heat storage material 7 into the latent heat storage state, "Qs-Q7," to determine whether the estimated incoming heat amount Qin is equal to or more than "Qs-Q7." In other words, it is determined whether the high melting point heat storage material 7 can enter the latent heat storage state by adding the heat of the estimated incoming heat amount Qin to the heat storage material 7.

Then, if it is determined at S105 that the estimated incoming heat amount Qin is equal to or more than "Qs-Q7," that is, if the heat storage material 7 can enter the latent heat storage state by adding the heat of the estimated incoming heat amount Qin to the heat storage material 7, heat storage in the heat storage materials 6 and 7 is performed in the first heat storage mode. Specifically, when the switch valve 11 is switched from the first switch position to the third switch position, the heat of the coolant water in the circulation circuit is applied to the heat storage material 7 for heat storage in the heat storage material 7. Then, when the high melting point heat storage material 7 enters the latent heat storage state, the switch valve 11 is switched from the third switch position to the second switch position. Accordingly, the heat of the coolant water in the circulation circuit is applied to the low melting point heat storage material 6 for heat storage in the low melting point heat storage material 6. In addition, when the heat storage material 6 enters the latent heat storage state or when the automobile is stopped before the heat storage material 6 enters the latent heat storage state, the switch valve 11 is switched to the first switch position to keep the heat storage materials 6 and 7 in the heat storage states at that time.

If it is determined at S105 that the estimated incoming heat amount Qin is less than "Qs-Q7," that is, if it is determined that the heat storage material 7 cannot enter the latent heat storage state even if the heat of the estimated incoming heat amount Qin is added to the heat storage material 7, heat storage in the heat storage materials 6 and 7 is performed in the second heat storage mode. In addition, if an operation of the automobile until stoppage cannot be predicted because no destination is set at the navigation system 19 or the like, in other words, if the estimated incoming heat amount Qin cannot be determined and thus the determination at S105 cannot be made based on the estimated incoming heat amount Qin, heat storage in the heat storage materials 6 and 7 is also performed in the second heat storage mode. Specifically, when the switch valve 11 is switched from the first switch position to the second switch position, the heat of the coolant water in the circulation circuit is applied to the heat storage material 6 for heat storage in the heat storage material 6. Then, when the low melting point heat storage material 6 enters the latent heat storage state, the switch valve 11 is switched from the second switch position to the third switch position. Accordingly, the heat of the coolant water in the circulation circuit is applied to the high melting point heat storage material 7 for heat storage in the heat storage material 7. In addition, when the heat storage material 7 enters the latent heat storage state or when the automobile is stopped before the heat storage material 7 enters the latent heat storage state, the switch valve 11 is switched to the first switch position to keep the heat storage materials 6 and 7 in the heat storage states at that time.

Figure 4:
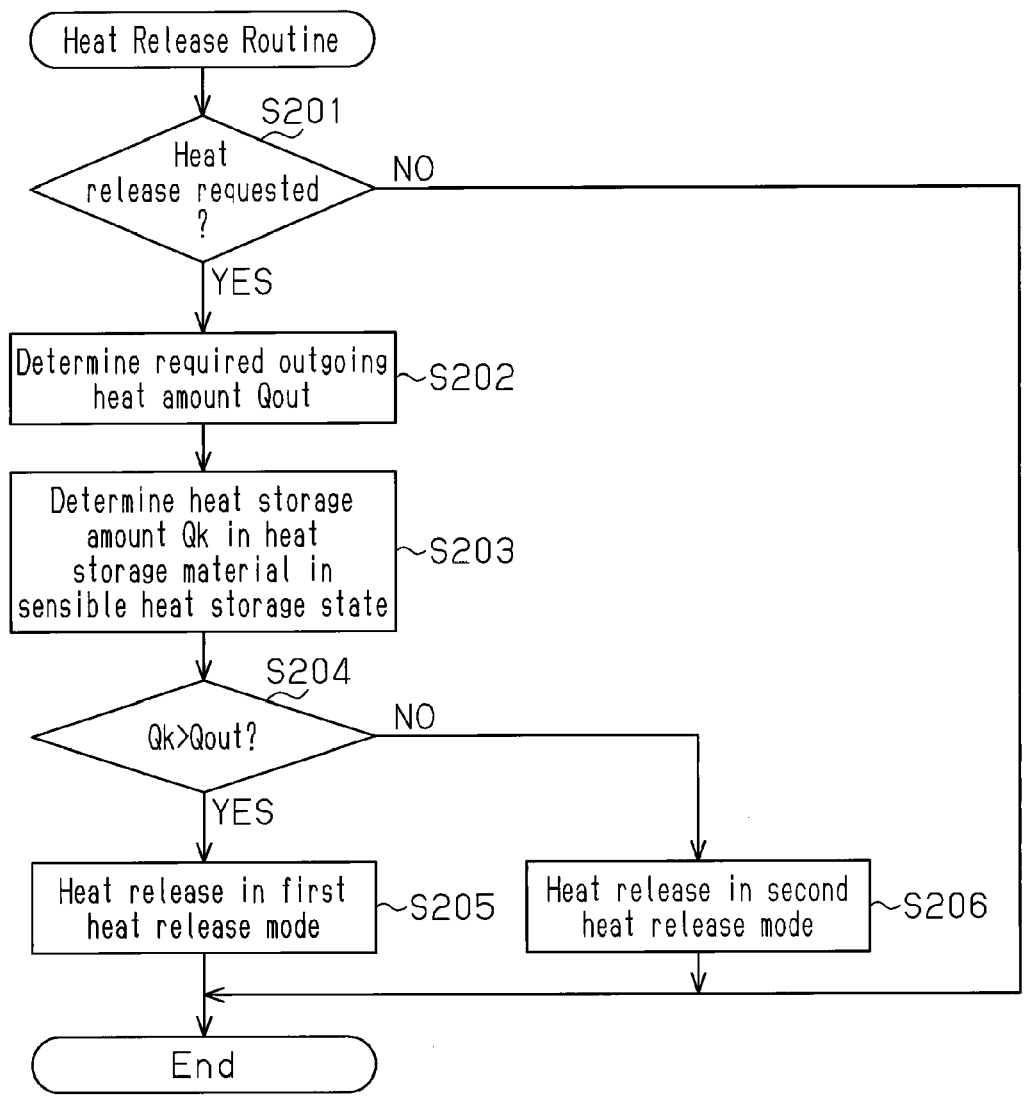
FIG. 4 is a flowchart of a procedure for heat release in the heat storage apparatus.

Next, details of heat release from the heat storage container 5 (the heat storage materials 6 and 7) will be described with reference to a flowchart for a heat release routine shown in FIG. 4. The heat release routine is executed by the electronic control unit 21 periodically by time interruptions at predetermined time intervals, for example.

In the routine, it is determined whether there is a request for heat release from the heat storage materials 6 and 7 (S201). Such a request for heat release is made, for example, if the temperature of the coolant water circulating in the circulation circuit is less than a determination value for determining completion of warming-up of the engine 1. Then, if it is determined that there is a request for heat release from the heat storage materials 6 and 7, steps for performing heat release from the heat storage materials 6 and 7 (S202 to S206) are performed.

In the series of steps, at S202, a required outgoing amount Qout is determined as a heat amount required to be released from the heat storage container 5 to increase the temperature of the coolant water in the circulation circuit up to the foregoing determination value. The required outgoing heat amount Qout is determined based on the difference between the temperature of the coolant water detected by the engine water temperature sensor 24 and the foregoing determination value. At S203, a heat storage amount Qk in the heat storage materials 6 and 7 in the sensible heat storage state is determined based on the current heat storage amount Q6 in the heat storage material 6 and the current heat storage amount Q7 in the heat storage material 7. The heat storage amount Q7 is determined in the same method as that described in relation to S105 of the heat storage routine. The heat storage amount Q6 is determined using the current temperature of the heat storage material 6 detected by the first temperature sensor 22*a* and a cumulative value of heat amounts having so far come into and gone out of the heat storage material 6, and the like. The cumulative value of heat amounts having so far come into and gone out of the heat storage material 6 can be calculated using signals from the first inlet water temperature sensor 22*b* and the first outlet water temperature sensor 22*c*. At S204, the required outgoing heat amount Qout is compared with the heat storage amount Qk in the heat storage materials 6 and 7 in the sensible heat storage state, to determine whether the heat storage amount Qk is larger than the required outgoing heat amount Qout. In other words, it is determined whether the temperature of the coolant water can be increased up to the determination value for determining completion of warming-up of the engine 1 by releasing the heat of the heat storage amount Qk to the coolant water in the circulation circuit.

Then, if it is determined at S204 that the heat storage amount Qk is larger than the required outgoing heat amount Qout, that is, if it is determined that the temperature of the coolant water can be increased up to the determination value for determining completion of warming-up of the engine 1 by releasing the heat of the heat storage amount Qk to the coolant water in the circulation circuit, heat release from the heat storage materials 6 and 7 is performed in the first heat release mode.

Specifically, if only the heat storage material 6 is in the sensible heat storage state or if both of the heat storage materials 6 and 7 are in the sensible heat storage state, when the switch valve 11 is switched from the first switch position to the second switch position, heat release is performed from the low melting point heat storage material 6 to the coolant water in the circulation circuit. Then, upon completion of heat release from the low melting point heat storage material 6, the switch valve 11 is switched from the second switch position to the third switch position, whereby heat release is performed from the high melting point heat storage material 7 to the coolant water in the circulation circuit. In contrast, if only the high melting point heat storage material 7 is in the sensible heat storage state, the switch valve 11 is switched from the first switch position to the third switch position, whereby heat release is performed from the high melting point heat storage material 7 to the coolant water in the circulation circuit. Then, upon completion of heat release from the high melting point heat storage material 7, the switch valve 11 is switched from the third switch position to the second switch position, whereby heat release is performed from the low melting point heat storage material 6 to the coolant water in the circulation circuit. In addition, at the time of heat release from the heat storage materials 6 and 7 in the first heat release mode, both of the heat storage materials 6 and 7 may be in the latent heat storage state. In this case, it is preferred that heat release is performed from the low melting point heat storage material 6 to the coolant water in the circulation circuit, and after completion of the heat release, heat release is performed from the high melting point heat storage material 7 to the coolant water in the circulation circuit.

If it is determined that the heat storage amount Qk is equal to or less than the required outgoing heat amount Qout, that is, if it is determined that the temperature of the coolant water cannot be increased up to the determination value for determining completion of warming-up of the engine 1 even when the heat of the heat storage amount Qk is released to the coolant water in the circulation circuit, heat release from the heat storage materials 6 and 7 is performed in a second heat release mode.

Specifically, if only the heat storage material 6 is in the sensible heat storage state, if only the heat storage material 7 is in the sensible heat storage state, or if both of the heat storage materials 6 and 7 are in the sensible heat storage state, the switch valve 11 is switched from the first switch position to the fourth switch position, whereby heat release is performed from the low melting point heat storage material 6 to the coolant water in the circulation circuit and also heat release is performed from the high melting point heat storage material 7 to the coolant water in the circulation circuit. In addition, at the time of heat release from the heat storage materials 6 and 7 in the second heat release mode, both of the heat storage materials 6 and 7 may be in the latent heat storage state. In this case, it is preferred that the switch valve 11 is first switched to the second switch position to perform heat release from the low melting point heat storage material 6 to the coolant water in the circulation circuit, and after completion of the heat release, the switch valve 11 is switched to the third switch position to perform heat release from the high melting point heat storage material 7 to the coolant water in the circulation circuit.

According to the embodiment described above in detail, the following advantages are achieved.

(1) As understood from the heat storage routine (FIG. 3), at the time of heat storage in the heat storage container 5 (the heat storage materials 6 and 7), heat storage is performed in the heat storage materials 6 and 7 such that the high melting point heat storage material 7 is in the latent heat storage state as much as possible. In other words, heat storage in the heat storage materials 6 and 7 is performed in such a manner that the heat storage materials 6 and 7 are in the latent heat storage state in which heat can be stored most effectively (the latent heat storage state in which heat can be stored for the longest period of time). Therefore, the heat storage container 5 (the heat storage materials 6 and 7) can be kept in the heat storage state for a long period of time.

(2) As understood from the heat release routine (FIG. 4), at the time of heat release from the heat storage container 5 (the heat storage materials 6 and 7) for heating the coolant water in the circulation circuit (temperature adjustment section of the automobile), heat release is performed as a priority from one of the heat storage materials 6 and 7 that is in the sensible heat storage state. Accordingly, heat release from the heat storage materials 6 and 7 in the heat storage state is performed in such a manner that the heat storage materials 6 and 7 are maintained in the latent heat storage state for as a long period of time as possible. When heat release from the heat storage container 5 (the heat storage materials 6 and 7) is performed in this manner, the heat storage materials 6 and 7 can be kept in the latent heat storage state for as a long period of time as possible, and thus the heat storage container 5 can be kept in the heat storage state for a long period of time.

(3) As understood from the foregoing heat release routine, if the required outgoing heat amount Qout can be satisfied only by the heat storage amount Qk in the heat storage material in the sensible heat storage state out of the heat storage materials 6 and 7, heat release is performed only from the heat storage material in the sensible heat storage state to the coolant water in the circulation circuit (temperature adjustment section of the automobile), whereby required heat is applied to the coolant water. In addition, if the required outgoing heat amount Qout cannot be satisfied only by the heat storage amount Qk in the heat storage material in the sensible heat storage state, heat release is performed also from the heat storage material in the latent heat storage state to the coolant water in the circulation circuit, whereby required heat is applied to the coolant water. When heat release from the heat storage materials 6 and 7 is performed in such a manner as described above, the heat storage materials can be kept in the latent heat storage state for as a long period of time as possible, and if required heat cannot be applied to the coolant water in the circulation circuit only by the heat storage amount Qk in the heat storage material in the sensible heat storage state, heat release can be performed also from the heat storage material in the latent heat storage state to realize the required heat application.

Second Embodiment

Next, a second embodiment of the present invention will be described with reference to FIG. 5.

Figure 5:
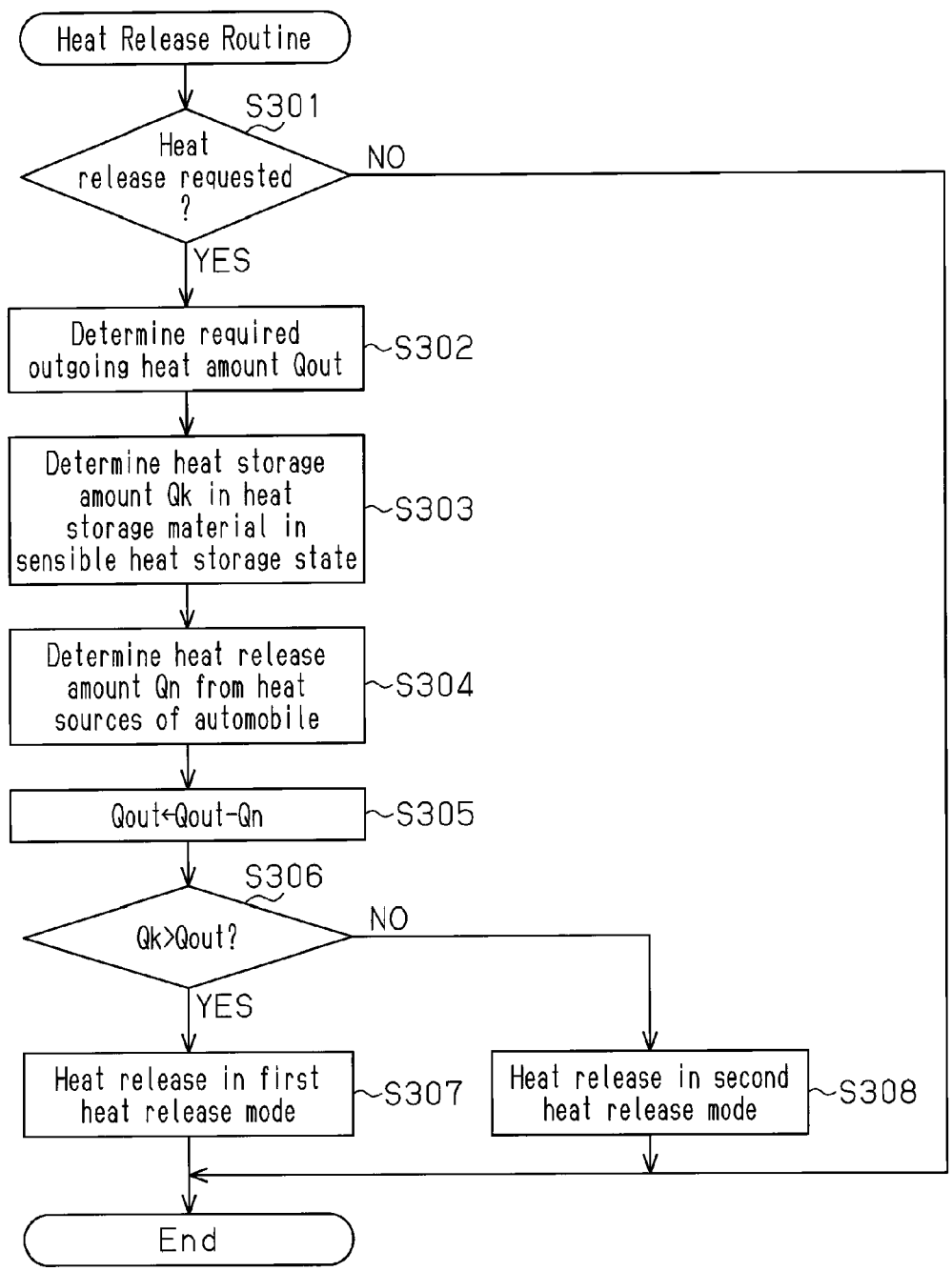
FIG. 5 is a flowchart of a procedure for heat release in a heat storage apparatus in a second embodiment.
Figure 6:
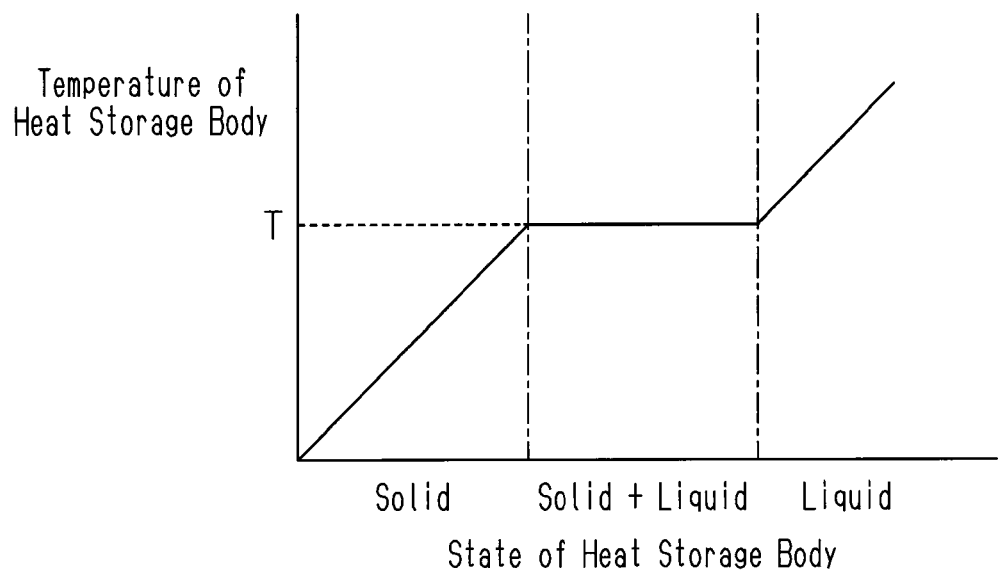
FIG. 6 is an illustrative diagram showing a relationship between changes in state of a heat storage body capable of latent heat storage and changes in temperature of the heat storage body.

FIG. 5 is a flowchart for a heat release routine in this embodiment. In the routine, steps (S301 to S303, S306, and S307) equivalent to steps S201 to S206 in the heat release routine in the first embodiment (FIG. 4) are performed and additional steps S304 and S305 are also performed. The additional steps (S304 and S305) are intended to determine the required outgoing amount Qout considering also heat release from the heat sources of the automobile to the coolant water in the circulation circuit.

The coolant water in the circulation circuit receives heat released from the heat sources of the automobile such as the engine 1 and the exhaust heat recovery unit 10, and increases in temperature also due to the heat release. Accordingly, the required outgoing heat amount Qout for heating the coolant water in the circulation circuit (temperature adjustment section of the automobile) to increase the temperature of the coolant water up to a determination value for determining completion of warming-up of the engine 1, is influenced by heat release from the heat sources of the automobile such as the engine 1 and the exhaust heat recovery unit 10 to the coolant water. Therefore, it is preferred to determine the required outgoing heat amount Qout with such influence into consideration, for improvement in accuracy of the required outgoing heat amount Qout.

At the foregoing steps (S304 and S305) to determine the required outgoing amount Qout considering heat release from the heat sources of the automobile to the coolant water in the circulation circuit, a heat release amount Qn is determined as an amount of heat to be transferred from the heat sources of the automobiles such as the engine 1 and the exhaust heat recovery unit 10 to the coolant water in the circulation circuit. Specifically, an amount of heat to be transferred from the engine 1 to the coolant water is estimated from parameters such as the amount of fuel consumed at the engine 1 and the intake air amount of the engine 1. In addition, an amount of heat to be transferred from the exhaust heat recovery unit 10 to the coolant water is estimated from parameters such as the temperature of exhaust from the engine 1, the amount of fuel consumed at the engine 1, and the intake air amount of the engine 1. Then, the foregoing heat release amount Qn is determined based on these estimated heat amounts. Subsequently, at S305, the heat release amount Qn is subtracted from the required outgoing heat amount Qout determined at S302, and a value obtained by the subtraction is set as a new required outgoing heat amount Qout.

As understood from step S305, the larger the heat release amount Qn, the smaller the required outgoing heat amount Qout becomes. Accordingly, with increase in the heat release amount Qn, there is a higher possibility that heat release from the heat storage container 5 (the heat storage materials 6 and 7) is performed in the first heat release mode through steps S306 to S308. Further, if the heat release amount Qn is equal to or more than the required outgoing heat amount Qout determined at S302, the required outgoing heat amount Qout can be satisfied by the heat release amount Qn. In this case, at the time of heat release from the heat storage container 5 (the heat storage materials 6 and 7) in the first heat release mode at step S307, since the required outgoing heat amount Qout is already satisfied by the heat release amount Qn, the switch valve 11 is inhibited from being switched to the first switch position so that the heat release from the heat storage container 5 is unnecessarily performed.

According to this embodiment, besides the advantages (1) to (3) in the first embodiment, the following advantages can also be obtained.

(4) The accuracy of the required outgoing heat amount Qout can be enhanced by determining the required outgoing heat amount Qout considering heat release from heat sources of the automobile to the coolant water in the circulation circuit. In this case, if heat release is performed from the heat storage container 5 to the coolant water in the circulation circuit to satisfy the required outgoing heat amount Qout with a low accuracy, the heat release may be performed unnecessarily by an error of the required outgoing heat amount Qout. However, the accuracy of the required outgoing heat amount Qout can be improved as described above. Thus, at the time of heat release from the heat storage container 5 to the coolant water in the circulation circuit to satisfy the required outgoing heat amount Qout, it is possible to suppress the unnecessary heat release as in the case where heat release is performed to satisfy the required outgoing heat amount Qout with a low accuracy.

Other Embodiments

In addition, the foregoing embodiments can be modified as described below, for example.

In the second embodiment, heat release from the heat storage container 5 in the second heat release mode may be performed as described below. Specifically, heat release is performed only from the heat storage material in the sensible heat storage state to heat the coolant water in the circulation path (temperature adjustment section of the automobile) until a predetermined period of time has elapsed since it was determined the required outgoing heat amount Qout cannot be satisfied only by the heat storage amount Qk in the heat storage material in the sensible heat storage state and the heat storage apparatus entered the second heat storage mode. Then, if it is still determined that the required outgoing heat amount Qout cannot be satisfied only by the heat storage amount Qk even after the lapse of the predetermined period of time, heat release is performed also from the heat storage material in the latent heat storage state to apply heat to the coolant water in the circulation circuit.

The required outgoing heat amount Qout for heating the coolant water in the circulation circuit varies with changes in heat amount applied directly from the heat sources of the automobile such as the engine 1 and the exhaust heat recovery unit 10 to the coolant water. Accordingly, immediately after it is determined that the required outgoing heat amount Qout cannot be satisfied only by the heat storage amount Qk in the heat storage material in the sensible heat storage state, out of the heat storage materials 6 and 7, the heat amount applied directly from the heat sources of the automobile to the coolant water may increase to reduce the required outgoing heat amount Qout. If heat release is performed from the heat storage material in the latent heat storage state under such circumstances, heat release may be performed from the heat storage material in the latent heat storage state to unnecessarily shift the state of the heat storage material to the sensible heat storage state, even though the required outgoing amount Qout can be satisfied only by heat release from the heat storage material in the sensible heat storage state.

However, as described above, even after it is determined that the required outgoing heat amount Qout cannot be satisfied only by the heat storage amount Qk in the heat storage material in the sensible heat storage state, heat release is still performed from the heat storage material in the sensible heat storage state until the predetermined period of time has elapsed. Then, if it is still determined that the required heat storage amount Qout cannot be satisfied even after the lapse of the predetermined period of time, heat release is performed from the heat storage material in the latent heat storage state. Accordingly, in a situation where the required outgoing heat amount Qout becomes smaller immediately after it is determined that the required outgoing heat amount Qout cannot be satisfied, it is possible to prevent heat release from being performed from the heat storage material in the latent heat storage state and to prevent the state of the heat storage material from being unnecessarily shifted to the sensible heat storage state.

In the first and second embodiments, the required outgoing heat amount Qout is defined as an amount of heat to be released from the heat storage container 5 to increase the temperature of the coolant water in the circulation circuit up to a determination value for determining completion of warming-up of the engine 1. However, the required outgoing heat amount Qout may not be a value defined in such a manner. For example, the required outgoing heat amount Qout may be defined as an amount of heat to be released from the heat storage container 5 to increase the temperature of the coolant water up to a value required for heating the vehicle interior by an air-conditioner (the heater core 9 or the like). In addition, if the circulation circuit is formed such that heat exchange takes place between oils in the engine 1 and the transmission, and the coolant water in the circulation circuit to heat the oils, the required outgoing heat amount Qout may be defined as an amount of heat to be released from the heat storage container 5 to increase the temperatures of the oils to an appropriate temperature.

If the present invention is applied to a hybrid automobile, the circulation circuit may be formed in such a manner that heat exchange takes place between a cooling medium circulating for cooling down a motor generator, an inverter, and the like and coolant water circulating in the circulation circuit, thereby to set the motor generator, the inverter, and the like as heat sources of the automobile for heat storage in the heat storage container 5.

At the time of determination of the heat storage amount Q6 in the heat storage material 6, the heat storage amount Q6 may be determined by estimation, in such a manner that some of the first temperature sensor 22*a*, the first inlet water temperature sensor 22*b*, and the first outlet water temperature sensor 22*c* are omitted to use detection values from the reduced number of sensors.

At the time of determination of the heat storage amount Q7 in the heat storage material 7, the heat storage amount Q7 may be determined by estimation, in such a manner that some of the second temperature sensor 23*a*, the second inlet water temperature sensor 23*b*, and the second outlet water temperature sensor 23*c* are omitted to use detection values from the reduced number of sensors.

The detection value from the first inlet water temperature sensor 22*b* and the detection value from the second inlet water temperature sensor 23*b* may be replaced with estimated values from the detection values from the engine water temperature sensor 24.

Various kinds of information for determining the estimated incoming heat amount Qin (such as the travel time and the travel distance) may be acquired in accordance with signals from a dedicated setting switch or the like operated by an occupant, not in accordance with information from the navigation system 19.

As a plurality of kinds of heat storage materials, three or more kinds of heat storage materials with different melting points may be used in such a manner that heat storage can be perform selectively in these heat storage materials and heat release can be performed selectively from these heat storage materials.

DESCRIPTION OF THE REFERENCE NUMERALS

1 . . . Engine, 2 . . . Water pump, 3 . . . Main passage, 4 . . . Bypass passage, 4*a* . . . Flow-split part, 4*b* . . . Flow-split part, 5 . . . Heat storage container, 5*a* . . . Accommodating chamber, 5*b* . . . Accommodating chamber, 6 . . . Heat storage material, 7 . . . Heat storage material, 9 . . . Heater core, 10 . . . Exhaust heat recovery unit, 11 . . . Switch valve, 19 . . . Navigation system, 20 . . . Air-conditioning control computer, 21 . . . Electronic control unit, 22*a* . . . First temperature sensor, 22*b* . . . First inlet water temperature sensor, 22*c* . . . First outlet water temperature sensor, 23*a* . . . Second temperature sensor, 23*b* . . . Second inlet water temperature sensor, 23*c* . . . Second outlet water temperature sensor, 24 . . . Engine water temperature sensor, 25 . . . Air flow meter, 26 . . . Rotational speed sensor, 27 . . . Exhaust temperature sensor

The invention claimed is:

1. A heat storage apparatus for a vehicle, comprising:
a heat storage body capable of storing latent heat upon receiving heat from a heat source of a vehicle; and
an electronic control unit controlling heat storage in the heat storage body and heat release from the heat storage body, wherein
the heat storage body includes a plurality of kinds of heat storage materials with different melting points, the heat storage materials being separated from one another so that the heat storage materials are capable of storing and releasing heat independently from one another, and
the electronic control unit is programmed to
when performing heat release from the heat storage body, perform heat release from a heat storage material in a sensible heat storage state prior to heat release from a heat storage material in a latent heat storage state,
determine a required outgoing heat amount, which is a heat amount required for heating a temperature adjustment section of the vehicle, and the heat storage amounts of the plurality of kinds of heat storage materials, if it is determined that the required outgoing heat amount cannot be satisfied by the heat storage amount in the heat storage material in the sensible heat storage state alone, perform heat release only from the heat storage material in the sensible heat storage state until after a lapse of a predetermined period of time since the determination, and if it is still determined that, even after the lapse of the predetermined period of time, the required outgoing heat amount cannot be satisfied by the heat storage amount in the heat storage material in the sensible heat storage state alone, perform heat release not only from the heat storage material in the sensible heat storage state but also from the heat storage material in the latent heat storage state.

2. A heat storage apparatus for a vehicle, comprising:

a heat storage body capable of storing latent heat upon receiving heat from a heat source of a vehicle; and an electronic control unit controlling heat storage in the heat storage body and heat release from the heat storage body, wherein the heat storage body includes two kinds of heat storage materials: a heat storage material with a low melting point and a heat storage material with a higher melting point, the heat storage materials being separated from each other so that the heat storage materials are capable of storing and releasing heat independently from each other, and the electronic control unit is programmed to, when performing heat storage in the heat storage body, if it is determined that latent heat storage in the higher melting point heat storage material is possible based on an estimated incoming heat amount from the heat source to the heat storage body and the heat storage amount left in the higher melting point heat storage material, perform the latent heat storage in the higher melting point heat storage material prior to heat storage in the low melting point heat storage material, and if such a determination cannot be made or it is determined that latent heat storage in the higher melting point heat storage material is impossible, perform heat storage in the low melting point heat storage material prior to heat storage in the higher melting point heat storage material.

3. A heat storage apparatus for a vehicle, comprising:

a heat storage body capable of storing latent heat upon receiving heat from a heat source of a vehicle; and an electronic control unit controlling heat storage in the heat storage body and heat release from the heat storage body, wherein the heat storage body includes at least a first heat storage material with a low melting point and a second heat storage material with a higher melting point, the first and second heat storage materials being separated from each other so that the first and second heat storage materials are capable of storing and releasing heat independently from each other, and the electronic control unit is programmed to:

when the first heat storage is in a sensible heat storage state and the second heat storage material is in a latent heat storage state, perform heat release from the first heat storage material prior to heat release from the second heat storage material, when the first heat storage material is in the latent heat storage state and the second heat storage material is in the sensible heat storage state, perform heat release from the second heat storage material prior to heat release from the first heat storage material, and when both the first and second heat storage materials are in the sensible heat storage state or in the latent heat storage state, perform heat release from the first heat storage material prior to heat release from the second heat storage material.

4. A heat storage apparatus for a vehicle according to claim 3, comprising:

wherein the electronic control unit is programmed to:

when performing heat release from the heat storage body, perform heat release from a heat storage material in a sensible heat storage state prior to heat release from a heat storage material in a latent heat storage state, determine a required outgoing heat amount, which is a heat amount required for heating a temperature adjustment section of the vehicle, and the heat storage amounts of the first and second heat storage materials, if it is determined that the required outgoing heat amount can be satisfied by the heat storage amount in the heat storage material in the sensible heat storage state alone, perform heat release only from the heat storage material in the sensible heat storage state, and if it is determined that the required outgoing heat amount cannot be satisfied by the heat storage amount in the heat storage material in the sensible heat storage state alone, perform heat release not only from the heat storage material in the sensible heat storage state but also from the heat storage material in the latent heat storage state.

5. The heat storage apparatus for a vehicle according to claim 3, wherein the electronic control unit is programmed to, when performing heat storage in the heat storage body, if it is determined that latent heat storage in the second heat storage material is possible based on an estimated incoming heat amount from the heat source to the heat storage body and the heat storage amount left in the second heat storage material, perform the latent heat storage in the second heat storage material prior to heat storage in the first heat storage material, and if such a determination cannot be made or it is determined that latent heat storage in the second heat storage material is impossible, perform heat storage in the first heat storage material prior to heat storage in the second heat storage material.

* * * * *